Dec. 7, 1965     R. A. BOLOMEY ETAL     3,222,439
METHOD OF CASTING POLYMERIZABLE RESINS CONTAINING
LAMELLAR PARTICLES
Filed Feb. 20, 1963
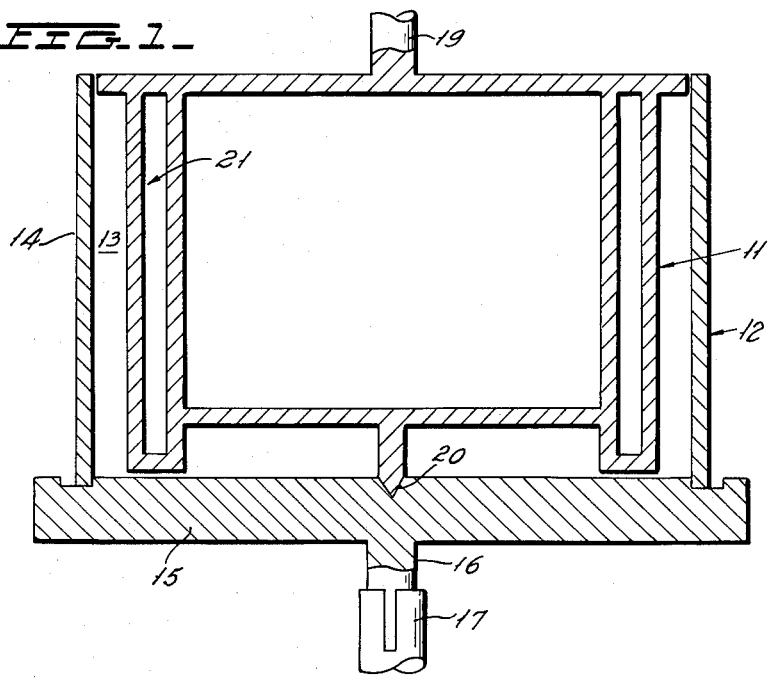
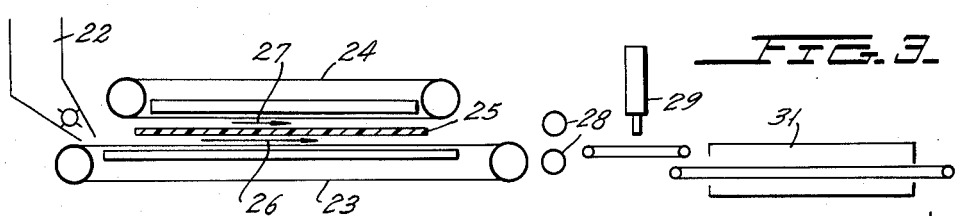
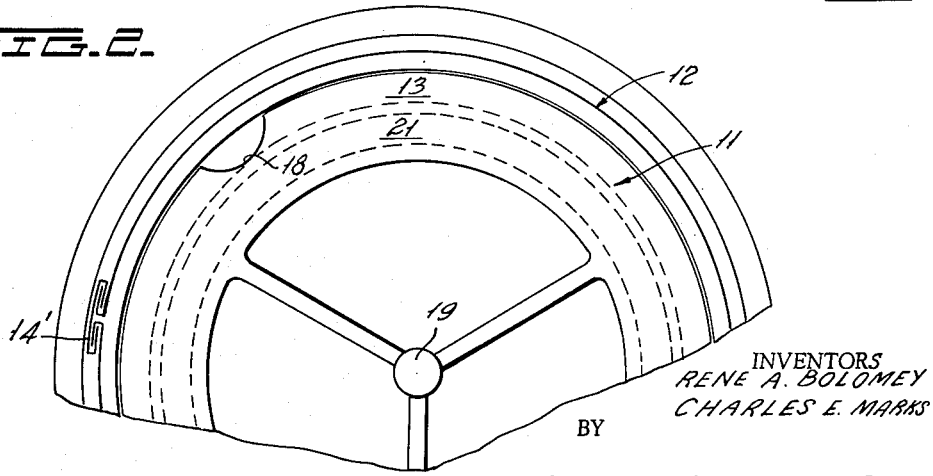
INVENTORS
RENE A. BOLOMEY
CHARLES E. MARKS
BY
OSTROLENK, FABER, GERB & SOFFEN
ATTORNEYS 3,222,439
METHOD OF CASTING POLYMERIZABLE RESINS CONTAINING LAMELLAR PARTICLES
Rene A. Bolomey, Peekskill, and Charles E. Marks, Garrison, N.Y., assignors to The Mearl Corporation, Ossining, N.Y., a corporation of New York
Filed Feb. 20, 1963, Ser. No. 259,959
6 Claims. (Cl. 264—108)

This invention relates to a method for casting polymerizable resins containing lamellar particles, and more particularly to such a method resulting in the production of plastic layers containing oriented lamellae, which layers may be used to prepare plastic buttons or like articles.

Lamellar particles are often used in plastics for the purpose of reflecting light in a specific manner. For example, nacreous or pearlescent pigments which consist of plate-like or lamellar particles are used to impart a pearl-like luster to plastic articles. Metallic flakes, such as aluminum, are used to produce a metallic sheen. Graphite also imparts a sheen to plastics, and is used to make plastic conductive.

The optical effects depend on control of the orientation of the lamellar particles. It is necessary that the orientation of the particles follow a given pattern, since the specific optical properties of lamellar particles are dissipated if the particles are in random orientation.

Plastic sheets containing nacreous pigments are used, for example, in the manufacture of pearl button blanks. For the standard type of button blank, it is desired that all the lamellar particles be oriented with their flat surfaces parallel to the surface of the button. This can be accomplished by stamping the button blanks from sheets in which all the plate-like particles are oriented parallel to the surface of the sheet. Pearl sheets of this type are made by incorporating the nacreous pigment or metallic flake in a polymerizable liquid, which is then solidified to produce a sheet.

In one type of casting procedure for producing such sheets, known as cell casting, the liquid pearl suspension is poured into a cavity which has the shape of the eventual solid sheet; such cells normally consist of two glass plates made into a cavity by means of a peripheral gasket which separates the two plates. In rotational casting, another common method, the liquid suspension containing the lamellar particles is poured into a cylinder which rotates around its axis of revolution, forming a plastic sheet against the cylindrical wall. Such a sheet is removed from the cylinder while it is still in the gel, or soft, stage, by slitting down the side, and is permitted to fall flat on a horizontal surface to produce a horizontal plastic sheet.

There are several methods for obtaining orientation in cell casting. In one of the most useful, the glass cells are subjected to some kind of oscillatory motion which causes the lamellar particles adjacent the cell surfaces to become oriented parallel to those surfaces. However, the lamellar particles are completely disoriented in the center of the resulting plastic sheet, i.e., in the entire plane which bisects the sheet in a direction parallel to the broad surfaces of the sheet. Button blanks cut from such sheets appear brilliant on the surface, but lose their pearl brilliance if subjected to too deep a cut when the final button is turned from the blank.

In rotational casting a brilliant luster is achieved on the surface of the plastic sheet which is adjacent to the polished cylindrical wall. However, the lamellar particles adjacent to the opposite surface, which is exposed to air during the polymerization, remain badly disoriented. This surface is correspondingly dull and lacking in pearl brilliance. Button blanks made from such rotationally cast sheets accordingly have a "right" and "wrong" side, complicating their utilization.

Various other procedures have been devised for orienting lamellar particles in resinous materials. Hence, it is known that one may oscillate a member at one side of the cell employed in cell casting, in order to effect orientation of the lamellar particles adjacent to such side. It is also known that one may squeeze horizontal layers of resinous materials containing lamellar particles into vertical sheets and, while so doing, to attempt to orient the lamellae while moving the resin film from the horizontal to the vertical plane. It has been found that such procedures, like those enumerated above, do not satisfactorily achieve a uniform orientation of the lamellar particles throughout the thickness of the plastic layer produced, but merely orient the lamellae in the strata adjacent to the surface or surfaces subjected to the orienting force.

It is accordingly among the objects of the present invention to provide a method of casting polymerizable resins to form cast plastics having lamellar particles substantially uniformly oriented throughout the thickness thereof.

A further object of the invention is to provide such a method which can be readily practiced by either batch or continuous operations.

Other objects and advantages of the invention will become apparent from the following detailed description thereof.

In accordance with the invention, we have devised a method for orienting lamellar particles within cast plastic articles, involving casting a layer of a polymerizable resinous material containing lamellar particles while simultaneously subjecting the opposite sides of such layer to a differential force which produces a velocity gradient across the layer and thus uniformly orients the lamellar particles therethrough. In this manner plastic sheets are produced containing lamellae which are uniformly oriented to simulate a uniform sheen or, in the case of nacreous pigments, a pearl-like luster. Such sheets may be utilized, for example, to form button blanks, which may be used on either side and which may be given any type of surface treatment without reducing or interfering with the reflective properties of the cast plastic.

Any polymerizable liquid organic material may be employed in the present method, whether thermoplastic or thermosetting, or whether in the form of a monomer, a prepolymer or a solution of a polymer in a monomer. Hence thermoplastic resinous materials such as styrene, methyl methacrylate, methyl acrylate, ethyl methacrylate or the like, or thermosetting resins such as polyesters cross-linked with styrene or other co-monomers, epoxy resins or the like, may be used. Similarly, those materials disclosed in column 3, lines 2 to 12 of Clewell et al. Patent 2,265,226; in column 2, lines 22 to 70 of Grunin et al. Patent 2,971,223; or in column 2, lines 42 to 52 of Broderson Patent 3,010,158, may be used in the instant casting procedure.

As indicated above, the lamellar particles to be oriented throughout the cast plastic include both natural and synthetic nacreous pigments such as natural pearl essence, lead hydrogen arsenate, lead hydrogen phosphate, basic lead carbonate, bismuth oxychloride, and plate-like titanium dioxide; metallic flakes composed of, for example, aluminum or copper; glass flakes; mica; graphite; etc.

The invention may be practiced by either batch or continuous operations. When utilizing a batch procedure, it is preferred to polymerize the pearl resin between two concentric surfaces, between which a relative rotation is provided. Two concentric cylinders may conveniently be employed in the practice of this embodiment of the invention, although the use of concentric spheres or hemispheres is also comprehended. Using this technique, it has been found that a very high degree of orientation is obtained at the opposing surfaces of the plastic layer and throughout the thickness of the layer cast between the two rotational surfaces. The cast cylinder thus produced may, in the case of those resins, e.g., polyesters, which produce soft, gelled casts, be axially slit to produce an oriented plastic sheet therefrom.

Employing the aforementioned batch procedure it is only necessary that, during casting of the polymerizable resinous material, a differential rotational velocity be maintained between the two concentric surfaces. Hence, for concentric cylinders, the outer cylinder may remain stationary while the inner cylinder rotates, or the inner cylinder may remain stationary while the outer cylinder rotates, or both cylinders may rotate with one cylinder rotating faster than the other or with the two cylinders rotating in opposite directions. The difference in rotational velocity between the two cylinders establishes a substantially uniform velocity gradient throughout the liquid resin during the polymerization procedure, and yields a casting with substantially uniform orientation.

In the described procedure, a very small velocity difference is sufficient to establish orientation. Generally it is desirable that the difference in linear velocity be between about 0.5 and 500, preferably between about 0.5 and 100, inches per minute. At lower velocities, the orienting force may be insufficient, while considerably higher velocities may cause some damage to the solidified cast tube before rotation ceases, or may cause too rapid polymerization because of frictional heat.

A further advantage of the concentric casting method over conventional rotational casting is that there is no tendency for the lamellae to concentrate at the outer wall of the cast through centrifugal action. In concentric casting, orientation is obtained by means of the velocity gradient across the polymerizing layer, not by means of centrifugal force. The advantage is of particular significance when the lamellae are composed of a substance of high density in a resin which undergoes a rather slow viscosity increase, e.g. basic lead carbonate in methyl methacrylate.

Conventional rotational casting often produces imperfections, known as "chicken tracks," on the surface of the cast which is exposed to air during the polymerization. The imperfections are visible in the "good" side, since the cast is translucent. Concentric casting, by eliminating the air surface, avoids these defects.

In conventional rotational casting there may furthermore be a difference in the degree of polymerization between the portion of the cast exposed to air and the part protected from air. This irregularity in the extent of the reaction may lead to differences in physical and chemical properties between the two sides of the cast sheet. No such problem affects concentric casting.

In continuous operations designed to produce the oriented lamellar plastic casts in accordance with the invention, it is preferred to cast the resinous material containing the desired lamellar particles between a pair of conveyors operating at differential speeds, whereby to apply a velocity gradient across the thickness of the plastic layer to orient the lamellae therein. The conveyors are so designed that, upon gelling of the resinous material, the differential mechanical force applied to the surfaces of the resin is eliminated and the resulting cast sheet is fed on one of the two conveyors for subsequent treatment. The cast plastic thus produced possesses excellent orientation of the lamellar particles therein throughout its thickness and can be produced at a continuous large scale rate.

For a fuller understanding of the nature of this invention, reference is made to the accompanying drawing in which:

FIGURE 1 is a vertical section taken through an apparatus for performing the method of the present invention batchwise;

FIGURE 2 is a plan view of the apparatus shown in FIGURE 1; and

FIGURE 3 is a schematic vertical section through an apparatus facilitating the practice of the present method by continuous operations.

Referring initially to FIGURES 1 and 2, a concentric casting device is illustrated including an inner cylinder 11 and a concentric outer cylinder 12 defining an annular mold section 13 therebetween. The outer cylinder is defined by spring-form walls 14 mounted on a rotatable turntable 15. Rotation of the turntable is produced from a drive shaft 16 connected to a slip clutch 17 designed to terminate the rotation of the turntable when a predetermined frictional resistance is produced between the cylinders 11 and 12. A filling hole 18 is provided for charging the liquid polymerizable material into the mold section 13.

The inner cylinder 11 may be stationary or, if desired, may be rotated from a drive shaft 19 about a suitable bearing point 20. A water jacket 21 is provided annularly of the cylinder 11 for the passage of heating or cooling media to provide temperature control during the casting procedure. The inner wall surfaces of the cylinders 11 and 12 are desirably of finely polished metal, to facilitate the release of the cast plastic cylinder produced in the mold section 13.

In one embodiment of the concentric casting device illustrated in FIGURES 1 and 2, cylinders 11 and 12 were employed, each having a length of 25 inches. The inner cylinder had an outside diameter of 23¾ inches and the outer cylinder an inner diameter of 24 inches. Upon casting a plastic material in the mold section 13 and slitting the soft cast cylinder axially of the device, plastic sheets about 75 inches in length, 24 inches in width and ⅛ inch in thickness were produced.

Referring now to FIGURE 3, an apparatus is schematically shown for the continuous production of cast plastic sheets containing oriented lamellae. The apparatus includes a feed hopper 22 for feeding a polymerizable liquid mixture containing the lamellar particles between a pair of conveyors 23 and 24, whose belts press against the plastic forming a plastic sheet 25 therebetween. The conveyor belts 23 and 24 have been shown in spaced relation in FIGURE 3 in order to indicate their respective velocities, illustrated by arrows 26 and 27. As indicated by the arrows the conveyors are operated at differential speeds, the lower conveyor 23 moving at a velocity greater than that of the upper conveyor 24 whereby to produce a velocity gradient through the plastic sheet while the resinous material is in a semi-liquid state to substantially uniformly orient the lamellar particles throughout the thickness of the sheet.

The lower conveyor 23 is substantially longer than the upper conveyor 24; the speed of the respective conveyors is adjusted relative to their lengths and the nature of the polymerizable material fed therebetween in order to facilitate application of the differential force exerted by the conveyors while the plastic mix is in a liquid state and to remove the differential force when the composition gels, the resulting solidified sheet being fed for further treatment over the lower conveyor 23.

The oriented sheet 25 may thereafter be fed between a pair of press rolls 28, under a punch 29 to produce button blanks or like articles, and finally through a curing oven 31 to a receiving bin 32.

It will be understood that the differential velocity between conveyors 23 and 24 may be obtained by maintaining the upper conveyor stationary, while moving the plastic on the lower conveyor, as well as by moving the two conveyor belts at different speeds. Furthermore, in place of the upper conveyor 24 a flat polished plate may be employed to produce the differential force acting upon the opposite surface of the resinous material.

The following examples are given to exemplify preferred embodiments of the batch procedure of the invention, performed in the apparatus of FIGURES 1 and 2 of the drawing; it will be understood that the invention is not limited to these examples.

*Example I*

The following suspension of nacreous pigment in polyester resin was prepared:

| | Grams |
|---|---|
| Polyester resin (Laminac 4128, American Cyanamid Co.) | 4000 |
| Basic lead carbonate nacreous pigment (Nacromer ZPG–B, The Mearl Corporation, containing 35% crystals) | 80 |
| Cobalt naphthenate (6% Co) | 4 |
| Methyl ethyl ketone peroxide (60% in dimethyl phthalate) | 40 |

The mixture, which before the addition of catalyst had a viscosity of approximately 750 cps., was poured into the apparatus at room temperature, without utilizing the water jacket 21. The outer cylinder 12 was set rotating at 5 r.p.m., producing a linear velocity of 375 inches per minute. After 10 minutes the viscosity rose suddenly as the polyester resin gelled. The rotation then stopped because of the slipping of the clutch 17.

The key 14' of the outer cylinder 12 was removed, permitting this cylinder to be pulled away from the gelled resin. The inner cylinder 11 was then raised, carrying the gelled resin on its surface. A cut parallel to the axis of rotation was made along one side of the gelled resin tube to permit the plastic to be peeled away from the surface of the inner cylinder. The gelled resin was then laid on a flat surface, producing a uniformly brilliant plastic sheet 75 inches x 25 inches x 1/8 inch, with equal brilliance on both surfaces.

Button blanks were cut from this sheet, and were then cured by heating at 100° C. for 15 minutes.

Microscopic examination of the button blanks showed that the orientation of the basic lead carbonate crystals was perfect on both sides. The uniformity of the orientation throughout the sheet was demonstrated by gradually planing down the surface: the lamellar particles were oriented parallel to the surface at all depths.

*Example II*

Monomeric methyl methacrylate was partially polymerized to form a syrup with a viscosity of 5000 cps. Nacreous pigment was dispersed in this syrup, as follows:

| | Grams |
|---|---|
| Basic lead carbonate nacreous pigment (Nacromer XTX, The Mearl Corporation, containing 35% crystals) | 40 |
| Methyl methacrylate syrup | 4000 |
| 25% acetyl peroxide in dimethylphthalate | 120 |

The mixture was poured into the apparatus, which was then brought to 60° C. by the circulation of hot water in the jacket of the inner cylinder 11. The outer cylinder 12 was rotated at 10 r.p.m., producing a linear velocity of 750 inches per minute.

After 4 hours, the viscosity had increased sufficiently to cause the clutch 17 to slip, and the rotation ceased. The system was maintained at temperature for an additional hour to complete the polymerization of the methyl methacrylate.

The key of the outer cylinder 12 was removed, and this cylinder was separated from the polymerized resin. The cast methacrylate tube was then removed from the raised inner cylinder 11 by means of three slices parallel to the axis of rotation and 120° apart. Button blanks could be cut from the three portions of the cylindrical shell since the radius of curvature was too large to interfere with the shape of the finished button.

It is possible to remove the entire cast tube as a unit without cutting into sections. The inner cylinder is caused to contract by means of a cold fluid in the jacket, thus releasing the cast. The separation is facilitated by the use of a mold release.

*Example III*

The procedure of Example I was repeated except that the nacreous pigment was replaced by 2.3 grams of aluminum flakes passing 325 mesh. The resulting cast sheet, after being opened and placed in a horizontal position, had a uniform silvery metallic sheen.

While in the preceding examples the invention has been described specifically with respect to batch operations for practicing the present method, it will be understood that the invention may be practiced according to the continuous procedure described above. Moreover, while the examples have dealt primarily with the manufacture of button blanks, the method of the present invention may similarly be utilized in the manufacture of other cast plastic articles containing oriented lamellar particles, such as light reflectors, translucent panels, structural panels, furniture tops, etc.

Since certain changes may be made in carrying out the above method without departing from the scope of the invention, it is intended that all matter contained in the above description shall be interpreted as illustrative and not in a limiting sense.

What is claimed is:

1. A method for forming a plastic article incorporating light-reflecting lamellae dispersed throughout the thickness thereof and oriented substantially uniformly in a given direction parallel to a pair of opposite surfaces of said article, which comprises casting a substantially homogeneous dispersion of said lamellae in a polymerizable resinous material in layer form and, during gelling of the layer, subjecting the opposite faces thereof to a differential, substantially continuous unidirectional force acting parallel to said faces, said force producing differential orienting forces extending unidirectionally and parallel to one another across substantially the entire thickness of said layer to effect the substantially uniform orientation of said light-reflecting lamellae.

2. The method as defined in claim 1, in which said polymerizable resinous material is a polymerizable liquid selected from the group consisting of a polyester resin and a partially polymerized methyl methacrylate resin, said liquids having disposed therein a basic lead carbonate nacreous pigment.

3. A method for forming a plastic article incorporating light-reflecting lamellae dispersed throughout the thickness thereof and oriented substantially uniformly in a given direction parallel to a pair of opposite surfaces of said article, which comprises casting a substantially homogeneous dispersion of said lamellae in a polymerizable resinous material in layer form between two concentric surfaces defining surfaces of revolution and, during gelling of said dispersion, unidirectionally differentially rotating said concentric surfaces to establish a velocity gradient between the opposite sides of said layer and thereby produce differential orienting forces extending unidirectionally and parallel to one another across substantially the entire thickness of said layer to effect the substantially uniform orientation of said light-reflecting lamellae.

4. The method as defined in claim 3, in which the differential velocity between said concentric surfaces is between 0.5 and 500 inches per minute, and in which the layer of said polymerizable resinous material formed and subjected to such differential velocity is of the order of 1/8 inch in thickness.

5. A method of making plastic sheet material as defined in claim 3, including the further steps of axially slicing the cylindrical plastic layer produced between said concentric surfaces, and cutting elements from the resulting portions of said layer to form plastic articles having oriented lamellar particles formed therein.

6. A method for forming a plastic article incorporating light-reflecting lamellae dispersed throughout the thickness thereof and oriented substantially uniformly in a given direction parallel to a pair of opposite surfaces of said article, which comprises casting a substantially homogeneous dispersion of said lamellae in a polymerizable resinous material in layer form between two substantially aligned conveyor flights extending parallel and adjacent to the opposite faces of the layer thus formed and, during gelling of said layer, establishing a differential unidirectional velocity between said flights to thereby produce differential orienting forces extending unidirectionally and parallel to one another across substantially the entire thickness of said layer to effect the substantially uniform orientation of said light-reflecting lamellae.

References Cited by the Examiner

UNITED STATES PATENTS

| 2,337,775 | 12/1943 | Schultz | 264—108 |
| 2,372,177 | 3/1945 | Conner | 264—108 |
| 2,380,363 | 7/1945 | Land et al. | 88—65 |
| 2,398,506 | 4/1946 | Rogers | 88—65 |
| 3,012,923 | 12/1961 | Slayter | 264—108 |
| 3,041,670 | 7/1962 | Broderson | 264—108 |

ROBERT F. WHITE, *Primary Examiner.*

ALEXANDER H. BRODMERKEL, *Examiner.*